(12) United States Patent
Hyon

(10) Patent No.: US 6,367,726 B1
(45) Date of Patent: Apr. 9, 2002

(54) DUAL-BEARING REEL HAVING DETACHABLE SIDE COVER

(75) Inventor: KwangHo Hyon, KyongKi-Do (KR)

(73) Assignee: ToYo Engineering Co., Ltd., KyongKi-Do (KR)

( * ) Notice: Subject to any disclaimer, the term of this patent is extended or adjusted under 35 U.S.C. 154(b) by 0 days.

(21) Appl. No.: 09/651,218

(22) Filed: Aug. 30, 2000

(30) Foreign Application Priority Data

Sep. 2, 1999 (KR) .............................. 99-37983

(51) Int. Cl.⁷ .............................................. A01K 89/015
(52) U.S. Cl. ........................................ 242/314; 242/312
(58) Field of Search ................................ 242/289, 310, 242/312, 314; D22/140, 141

(56) References Cited

U.S. PATENT DOCUMENTS

| | | | | |
|---|---|---|---|---|
| 5,429,318 A | * | 7/1995 | Sato ............................ | 242/314 |
| 5,743,479 A | * | 4/1998 | Miyazaki et al. ........... | 242/314 |
| 5,984,221 A | * | 11/1999 | Kim ............................ | 242/289 |
| 6,003,798 A | * | 12/1999 | Kim ............................ | 242/289 |
| 6,152,389 A | * | 11/2000 | Kim ............................ | 242/312 |
| 6,168,106 B1 | * | 1/2001 | Cockerham ................ | 242/289 |
| 6,206,312 B1 | * | 3/2001 | Oh ............................. | 242/314 |

FOREIGN PATENT DOCUMENTS

| | | | | |
|---|---|---|---|---|
| GB | 2246692 | * | 2/1992 | ................. 242/312 |

* cited by examiner

Primary Examiner—Emmanuel M. Marcelo
(74) Attorney, Agent, or Firm—Notaro & Michalos P.C.

(57) ABSTRACT

Disclosed is a dual-bearing reel for fishing including a detachable side cover. The dual-bearing reel comprises a side cover having a disengaging groove and a number of engaging slits; a spool cover engaged to an inner portion of the side cover, the spool cover having a plurality of wedged cam bosses formed radially, a hole for receiving a stopper, a groove for receiving a stopper spring, and a plurality of holes for receiving a screw; a lever engaged to an outer portion of the side cover, the lever having a hole for receiving a stopper, a hole for receiving a screw, a rectangular boss formed on a center thereof, and a stopping boss on an outer periphery; a stopper engaged to the hole of the spool cover, the stopper having a latching boss and a slanted surface; and a push plate engaged to an outer portion of the lever, the plate having an extended hole for receiving a boss of the lever, a plurality of protruded arms threaded with a screw, and a pushing boss pushing a slanted surface of the stopper.

1 Claim, 7 Drawing Sheets

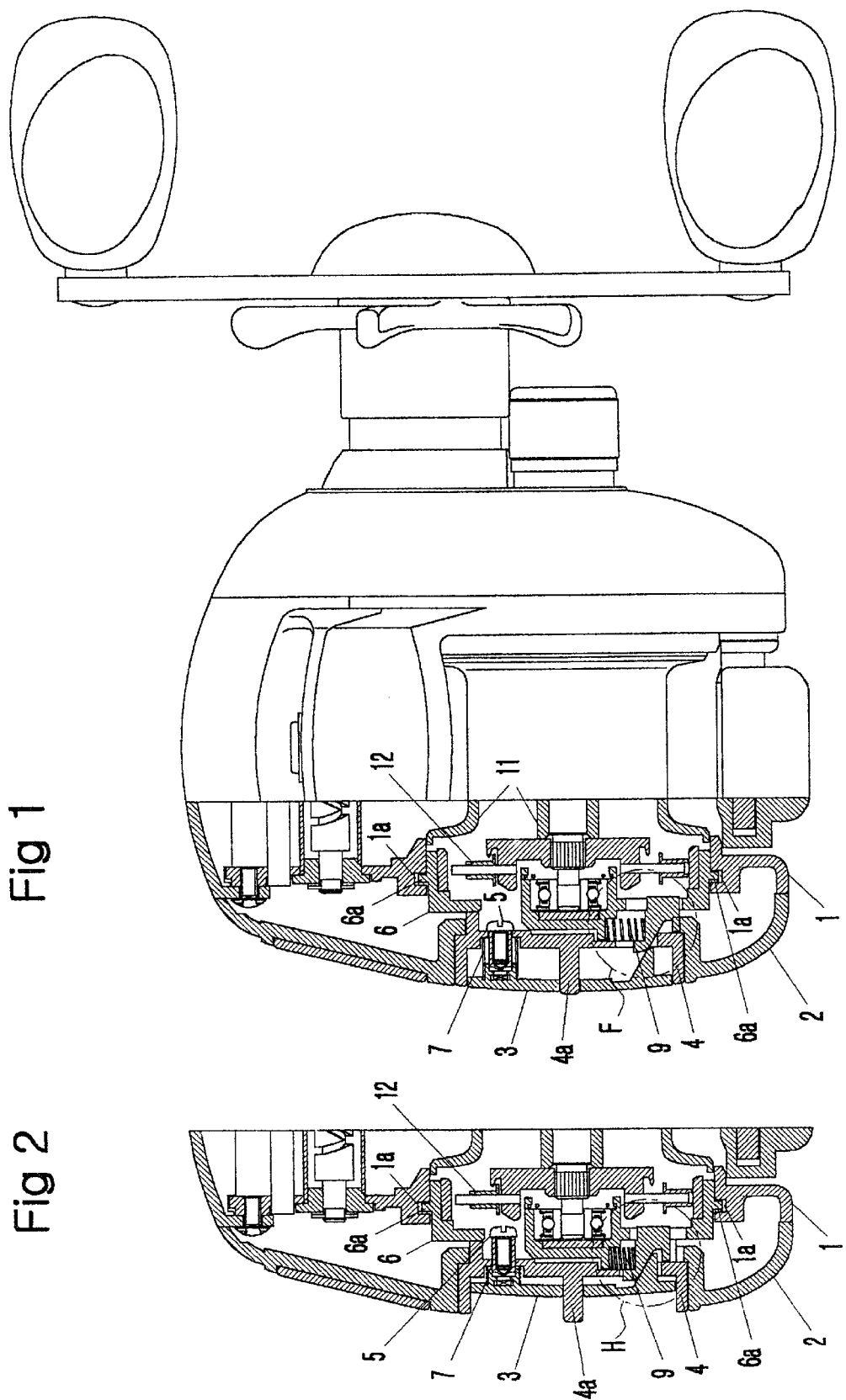

DUAL-BEARING REEL HAVING DETACHABLE SIDE COVER

BACKGROUND OF THE INVENTION

1. Field of the Invention

The present invention relates to a dual-bearing reel called as a bait casting reel, and more particularly to a dual-bearing reel having a detachable side cover.

2. Description of the Related Art

Bait Dual-bearing reels are generally constructed in such a way that a pinion is rotated with a gear train driven in response to the rotation of a handle, and a spool is rotated in the winding direction by transferring the rotating force of the pinion to a spool shaft.

During casting a bait, if a fishing line is entangled on the spool, a user has to disentangle the fishing line. In order to disentangle the fishing line, the user has to displace the spool with a new spool by opening a side cover from a body of the reel. In addition, in order to control a braking force, the user may be open the side cover and adjust a brake positioned in the side cover. It is very important for the dualbearing reel to engage and disengage the side cover to and from the body.

Specifically, in order to displace the spool or operate the brake, the reel must includes the side cover which be easily engaged and disengaged from the body of the reel.

According to the construction of a prior art dual-bearing reel, a few long bolt penetrate a body of a reel to fix a side cover. This construction has a problem in that a tool is needed to engage or disengage the side cover and such an operation is very cumbersome. In addition, there is another problem in that the side cover is easily disengaged from the body.

Also, according to another prior art dual-bearing reel, when a side cover integrally formed with a spool cover is engaged to a body, a boss of the spool cover is inserted into a boss of a reel body by rotating the side cover. In such a reel, since the position of the boss of spool cover has to correspond to that of the reel body, it is difficult to manufacture the spool cover and the reel body. In addition, a clearance may be happened between the side cover and the reel body due to the wear of boss or groove, thereby generating a noise or vibration.

According to still another prior dual-bearing reel, a side cover is provided with a lever to raise the side cover, and a male thread of a spool cover is threaded into a female thread of a reel body. Such a reel has a complicated structure.

SUMMARY OF THE INVENTION

Accordingly, to solve the problems stated above, an object of the present invention is to provide a dual-bearing reel having a detachable side cover capable of easily displacing or operating a component by a hand without using a tool.

Another object of the present invention is to provide a dual-bearing reel having a detachable side cover which is fixedly engaged to a reel body.

Still another object of the present invention is to provide a dual-bearing reel having a detachable side cover which is engaged or disengaged from a reel body with one touch operation.

To achieve the above and other objects, according to one aspect of the present invention, there is provided with a dual-bearing reel comprises a side cover having a disengaging groove and a number of engaging slits; a spool cover engaged to an inner portion of the side cover, the spool cover having a plurality of wedged cam bosses formed radially, a hole for receiving a stopper, a groove for receiving a stopper spring, and a plurality of holes for receiving a screw; a lever engaged to an outer portion of the side cover, the lever having a hole for receiving a stopper, a hole for receiving a screw, a rectangular boss formed on a center thereof, and a stopping boss on an outer periphery; a stopper engaged to the hole of the spool cover, the stopper having a latching boss and a slanted surface; and a push plate engaged to an outer portion of the lever, the plate having an extended hole for receiving a boss of the lever, a plurality of protruded arms threaded with a screw, and a pushing boss pushing a slanted surface of the stopper.

BRIEF DESCRIPTION OF THE DRAWINGS

The above objects, other features and advantages of the present invention will become more apparent by describing the preferred embodiment thereof with reference to the accompanying drawings, in which:

FIG. 1 is a cross-sectional view illustrating the construction of a dual-bearing reel according to the present invention.

FIG. 2 is a cross-section view illustrating a pushed state of a push button.

DETAILED DESCRIPTION OF THE PREFERRED EMBODIMENT

Figure 3:
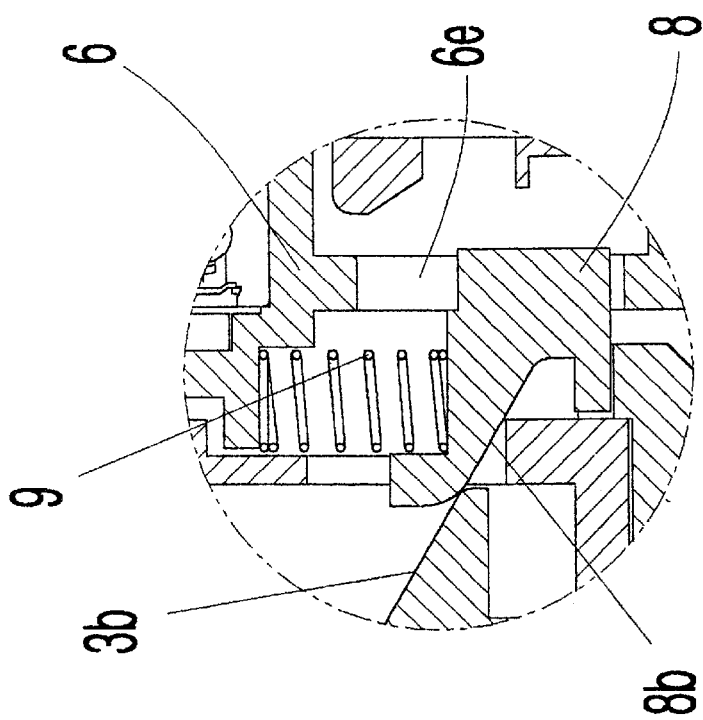
FIG. 3 is an enlarged view of a circle F in FIG. 1.

The construction and operation of the present invention will be explained in detail with reference to the accompanying drawings.

A dual-bearing reel according to the present invention comprises a side cover 2 having a disengaging groove 2a, a number of engaging slits 2b, and a wall 2c adjacent to the groove and slit which are formed inside of a hole 2e, a spool cover 6 engaged to an inner portion of the side cover, a lever 4 engaged to an outer portion of the side cover, a push button 3 engaged to an outer portion of the lever.

The spool cover 6, as shown if FIGS. 6 to 9, includes three wedged cam bosses 6a formed radially, a hole 6e for receiving a stopper 8, a groove 6b for receiving a stopper spring 8, and a number of holes 6c and 6f for receiving a screw.

The lever 4 includes a hole 4b for receiving a stopper 8, a hole 4d for receiving a screw, a rectangular boss 4a formed on a center thereof, and a stopping boss 4c on an outer periphery.

The stopper 8 is engaged to the hole 6e of the spool cover, and an upper portion of the stopper is inserted into the hole 4b of the lever. The stopper has a latching boss 8a and a slanted surface 8b.

The push plate 3 includes an extended hole 3a for receiving a boss 4a of the lever, a number of protruded arms 3c threaded with a screw 5, and a pushing boss 3b pushing the slanted surface 8b of the stopper.

The operation of the dual-bearing reel according to the present invention will be now explained with reference to the accompanying drawings.

Figure 4:
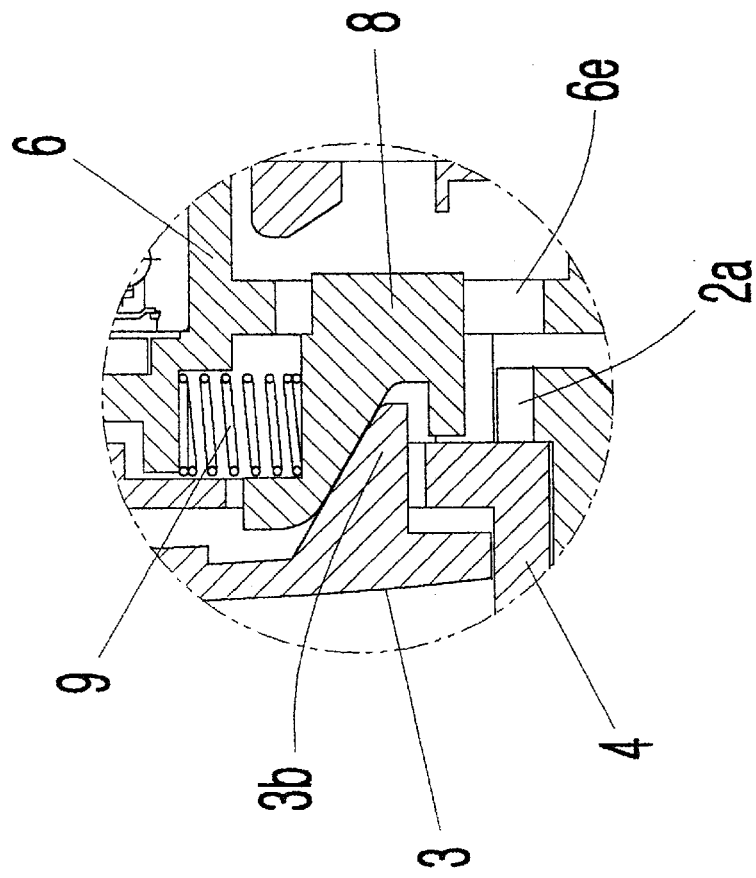
FIG. 4 is an enlarged view of a circle H in FIG. 1
Figure 5:
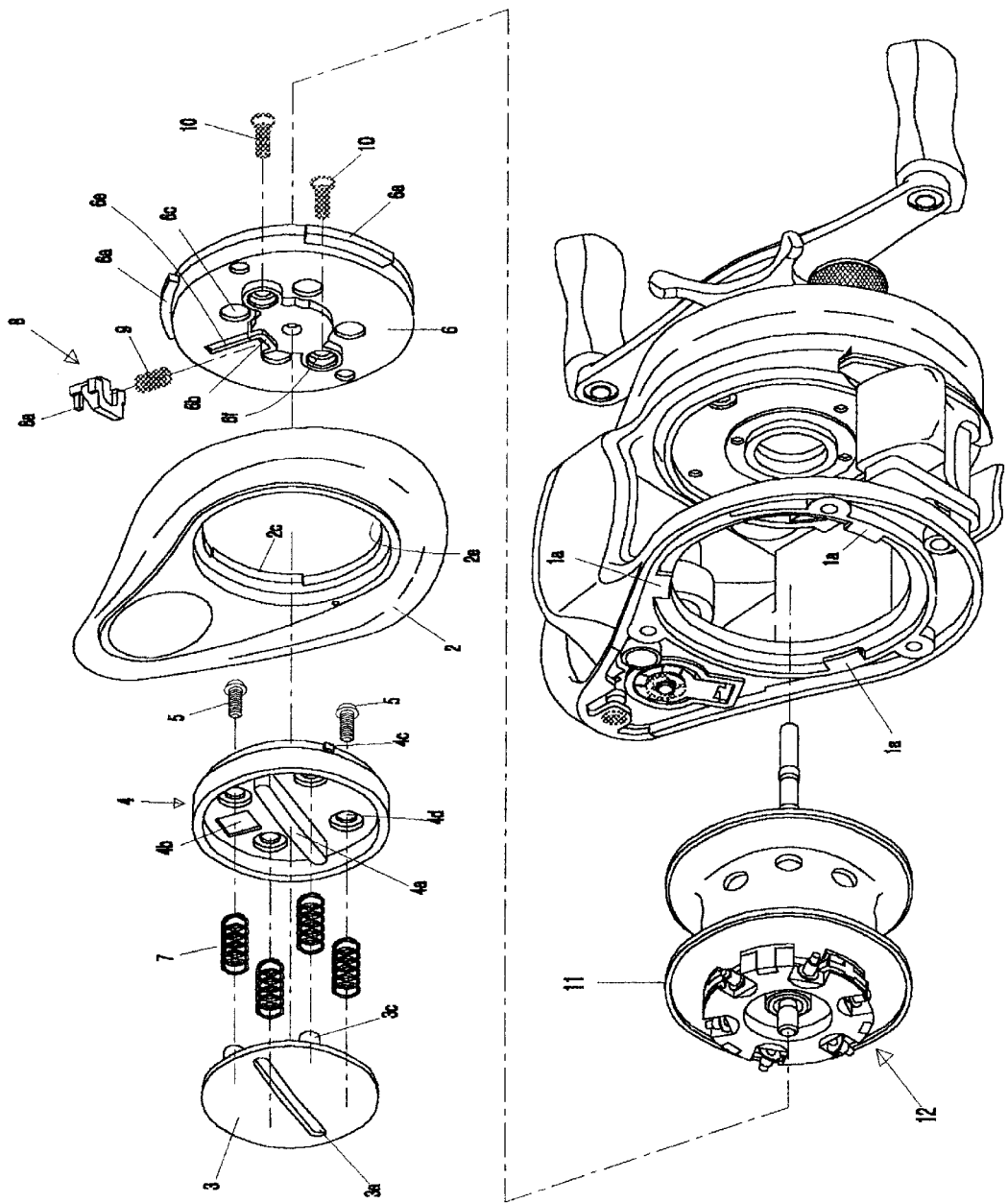
FIG. 5 is an exploded view illustrating the construction of a dual-bearing reel according to the present invention.
Figure 6:
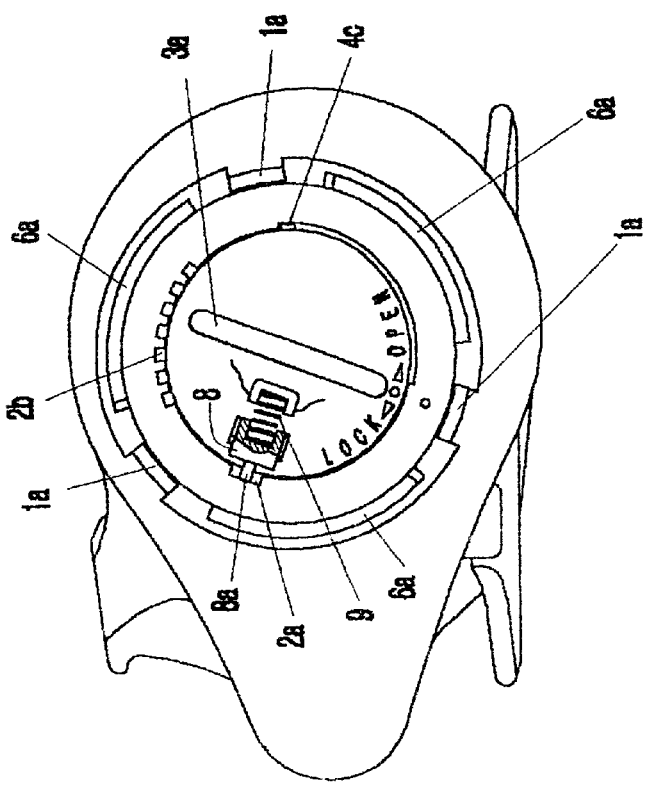
FIG. 6 is a front view illustrating an opened state of a lever.
Figure 7:
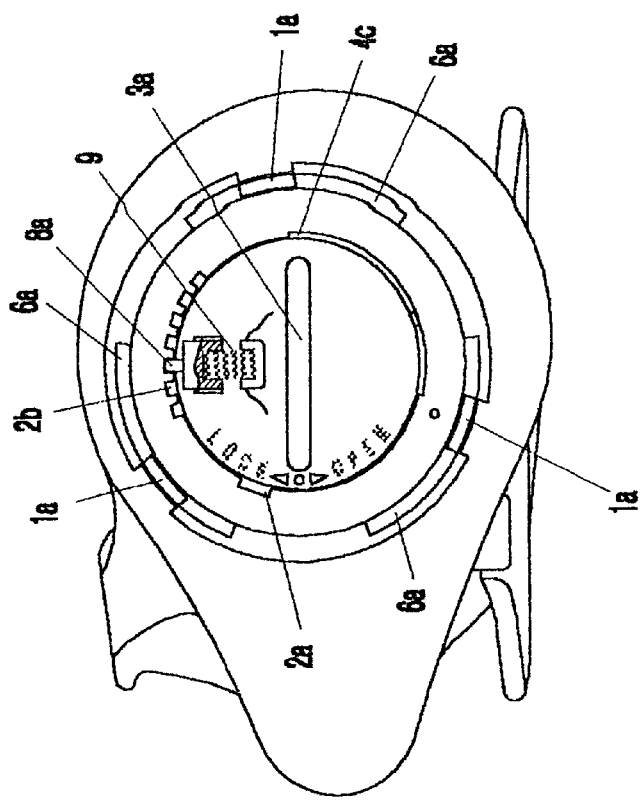
FIG. 7 is a front view illustrating a closed state of a lever.
Figure 9:
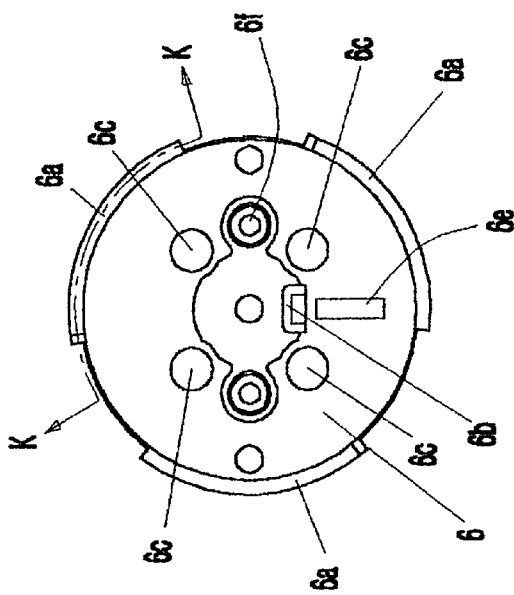
FIG. 9 is a front view of a spool cover.
Figure 8:
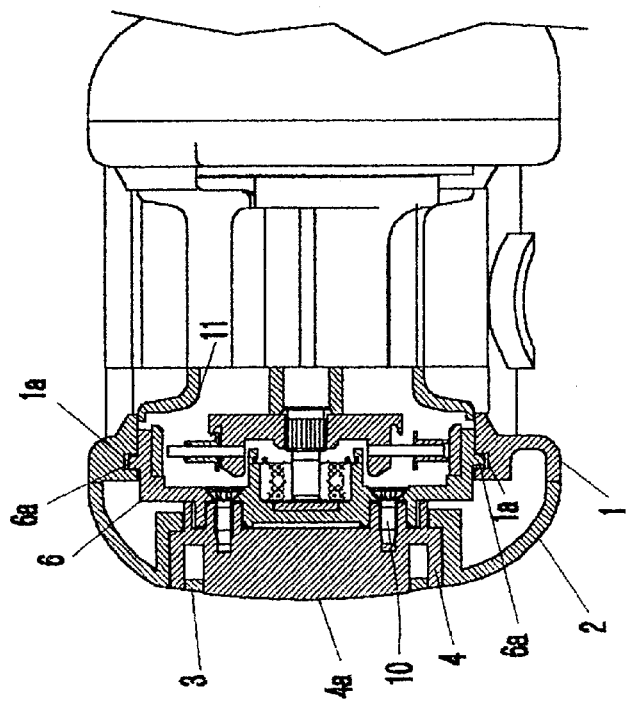
FIG. 8 is a cross-section view illustrating the construction of a dual-bearing reel according to the present invention.
Figure 10:
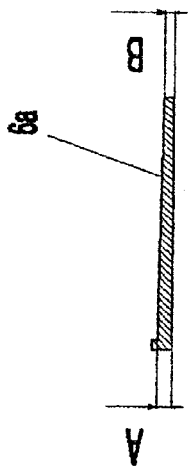
FIG. 10 is a cross-sectional view taken along a line K—K in FIG. 9.
Figure 12:
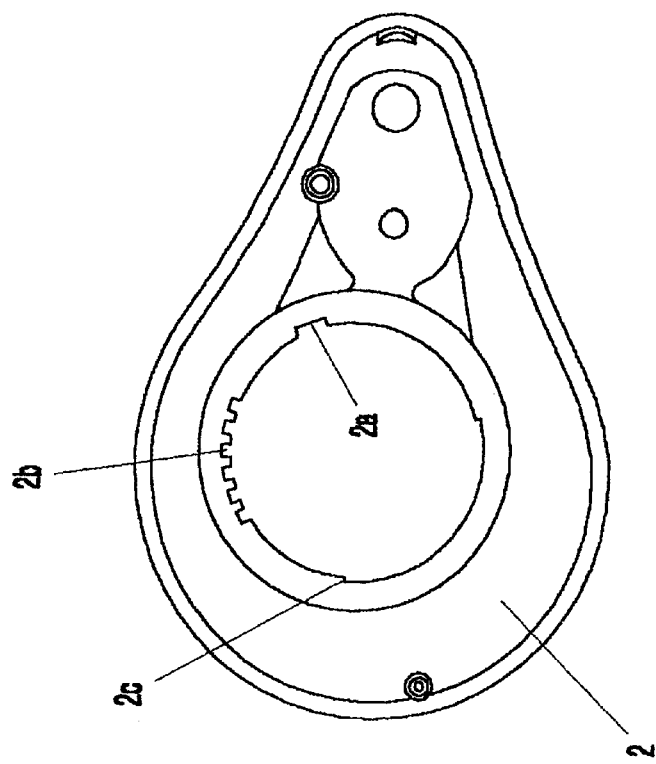
FIG. 12 is a front view illustrating the interior of a side cover.
Figure 11:
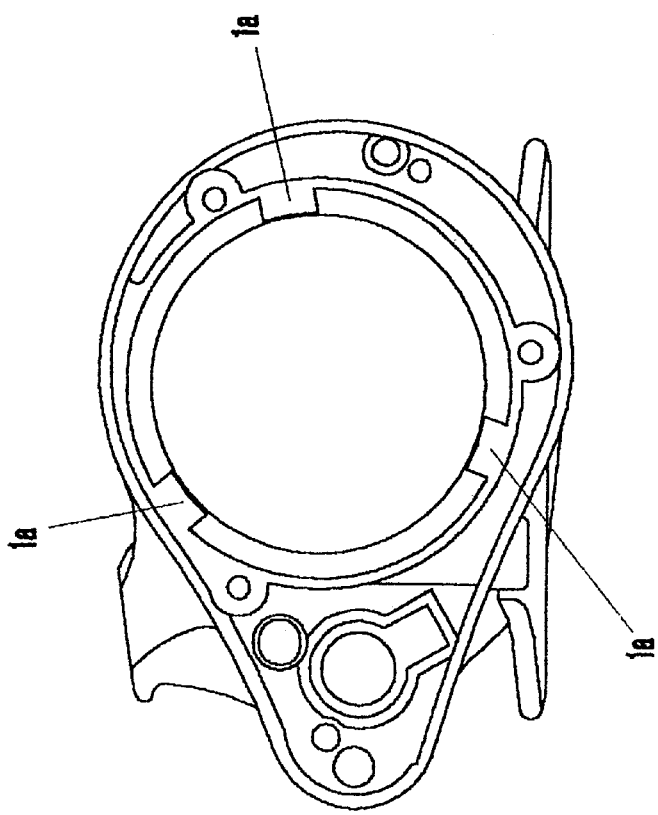
FIG. 11 is a front view of a reel body.
Figure 13:
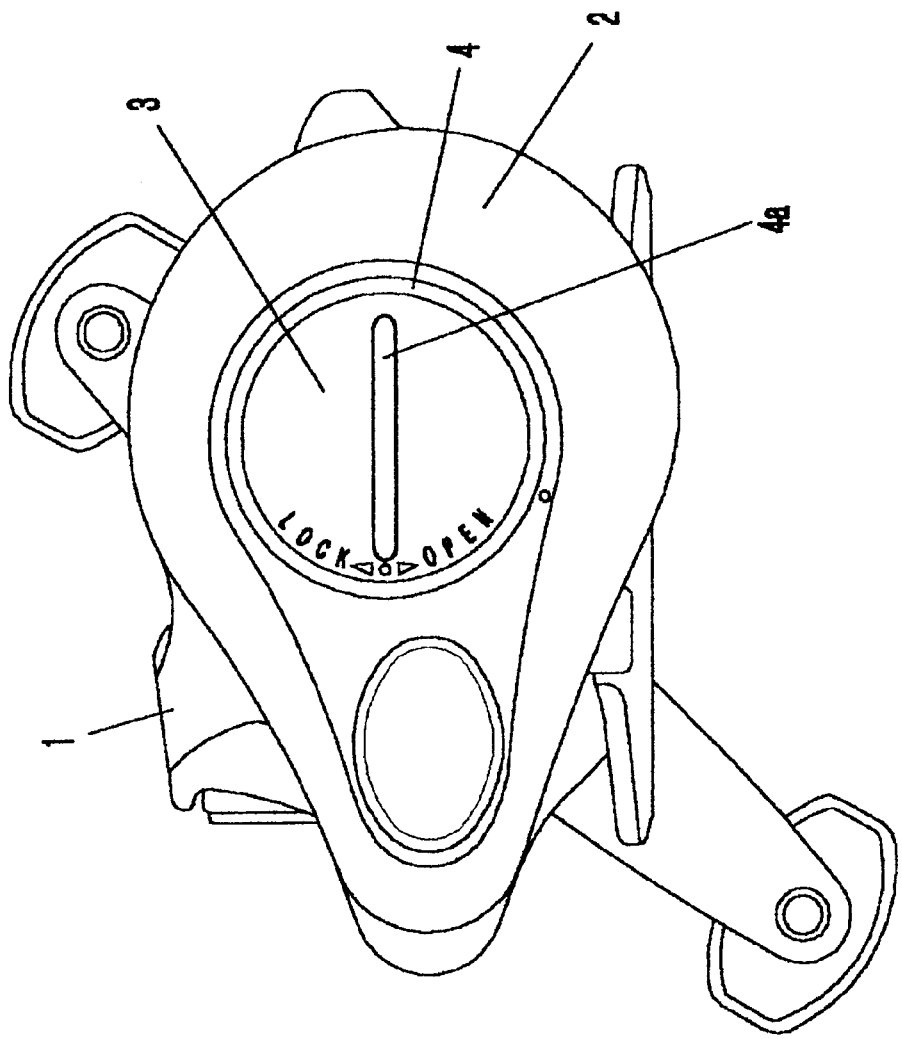
FIG. 13 is a front view illustrating the assembled state of the reel according to the present invention.

In order to engage the side cover to the reel body, if the pushing boss 3b is downwardly moved along the slanted surface 8b of the stopper 8 by the pushing operation of the push plate, the stopper 8 moves inwardly (FIG. 4). At that time, the latching boss 8a is released from the latching groove 2a of the side cover 2.

If the boss 4a of lever 4 is rotated in a lock direction, the cam boss 6a of the spool cover 6 is contacted with a latching boss 1a of a reel body 1 and is rotated together with the reel body. Since the cam boss 6a is shaped in a wedge of a gradually increased thickness, the cam boss 6a is fixedly engaged to the latching boss Ia of the reel body. At that time, if the pressure applied to the push plate 3 is removed, the push plate is returned to its original position by a biasing force of the spring 7. And, the stopper 8 is moved outwardly by the biasing force of the stopper spring 9, and the latching boss 8a is inserted into one of stopping grooves 2b of the side cover (referring to FIG. 7), so that the side cover is fixedly engaged to the reel body.

In order to disengage the side cover from the reel body, if the push plate is pushed and simultaneously, the boss 4a of the lever is rotated in an open direction, the stopper 8 is moved inwardly by the pushing boss 3b. The stopping boss 8a of the stopper 8 is released from the latching groove 2b, and the cam boss 6a of the lever is released from the latching boss la of the reel body. At that time, the stopping boss 4c of the lever is not rotated by a wall 2c of the side cover, so that the side cover can be released from the reel body. And then, if the pressure applied to the push plate 3 is removed, the latching boss 8a of the stopper 8 is inserted into the latching groove 2a of the side cover by the biasing force of the stopper spring 9, so that the cam boss 6a of the spool cover is fixed (referring to FIG. 6).

With the construction, the side cover is easily detachable from the dualbearing reel by a hand without using a tool. The side cover is fixedly engaged to the reel body. And, since the side cover has a cam structure, a clearance is not happened between the side cover and the reel body.

Although the present invention has been described with reference to the drawings, it is understood that this description is not to limit the present invention to the embodiments shown in the drawings but simply to explain the present invention. One skilled in the art will understand that various changes and modifications can be made from the embodiments disclosed in the specification. Therefore, the scope of the present invention should be defined by the appended claims.

What is claimed is:

1. A dual-bearing reel for fishing comprising:

a side cover having a disengaging groove and a number of engaging slits;

a spool cover engaged to an inner portion of the side cover, the spool cover having a plurality of wedged cam bosses formed radially, a hole for receiving a stopper, a groove for receiving a stopper spring, and a plurality of holes for receiving a screw;

a lever engaged to an outer portion of the side cover, the lever having a hole for receiving the stopper, a hole for receiving a screw, a rectangular boss formed on a center thereof, and a stopping boss on an outer periphery;

the stopper engaged to the hole of the spool cover, the stopper having a latching boss and a slanted surface; and a push plate engaged to an outer portion of the lever, the plate having an extended hole for receiving the boss of the lever, a plurality of protruded arms threaded with a screw, and a pushing boss pushing the slanted surface of the stopper.

* * * * *